(12) United States Patent
Acuna et al.

(10) Patent No.: US 8,851,441 B2
(45) Date of Patent: Oct. 7, 2014

(54) ENGINE SKID ASSEMBLY

(75) Inventors: Antonio Acuna, San Diego, CA (US); Pablo Alfonso Olachea Quiñones, Tijuana (MX)

(73) Assignee: Solar Turbine Inc., San Diego, CA (US)

(*) Notice: Subject to any disclaimer, the term of this patent is extended or adjusted under 35 U.S.C. 154(b) by 98 days.

(21) Appl. No.: 13/474,480

(22) Filed: May 17, 2012

(65) Prior Publication Data

US 2013/0306830 A1 Nov. 21, 2013

(51) Int. Cl.
*F16M 13/00* (2006.01)

(52) U.S. Cl.
USPC ............ 248/554; 248/558; 248/647; 206/319

(58) Field of Classification Search
USPC ................ 248/544, 554, 558, 646, 647, 671, 248/346.03, 346.3; 280/404, 405.1, 460.1; 206/319; 269/17; 410/49; 73/116.02
See application file for complete search history.

(56) References Cited

U.S. PATENT DOCUMENTS

| | | | | |
|---|---|---|---|---|
| 2,271,944 A * | 2/1942 | Mall | ............................. | 248/647 |
| 2,921,784 A * | 1/1960 | Miller | ............................. | 269/17 |
| 3,850,419 A * | 11/1974 | Craig | ............................. | 269/17 |
| 4,177,978 A * | 12/1979 | Warsaw | ........................... | 269/17 |
| 4,305,508 A * | 12/1981 | Rodgers | ........................ | 211/85.8 |
| 4,382,733 A | 5/1983 | Rodgers | | |
| 4,440,265 A * | 4/1984 | Spagnoli | ........................ | 182/129 |
| 4,660,796 A * | 4/1987 | Garrec | ........................... | 248/544 |
| 4,804,162 A * | 2/1989 | Rice | ............................... | 248/671 |
| 4,932,628 A * | 6/1990 | Pacheco | ......................... | 248/676 |
| 5,505,425 A * | 4/1996 | Shelton | ......................... | 248/670 |
| RE36,170 E * | 3/1999 | Lilja et al. | ..................... | 414/343 |
| 6,170,141 B1* | 1/2001 | Rossway et al. | ............. | 29/281.1 |
| 6,298,536 B1* | 10/2001 | Rossway et al. | ............. | 29/281.1 |
| 7,726,182 B1* | 6/2010 | Newlin et al. | ............... | 73/116.02 |
| 7,963,542 B2 | 6/2011 | Doll | | |
| 8,336,846 B2* | 12/2012 | Fernley et al. | ................. | 248/671 |
| 2003/0062663 A1* | 4/2003 | Fox | .................................. | 269/17 |
| 2006/0113435 A1* | 6/2006 | Nikolic | ........................ | 248/122.1 |
| 2010/0052288 A1* | 3/2010 | Doll et al. | ..................... | 280/404 |

FOREIGN PATENT DOCUMENTS

JP 7102906 A 4/1995

* cited by examiner

*Primary Examiner* — Bradley Duckworth (57) ABSTRACT

A skid assembly for a gas turbine engine includes a first segment having a first engine support structure and a second segment having one or more second engine support structures. The first engine support structure configured to support a gas producer group of the gas turbine engine and the one or more second engine support structures configured to support a turbine power group of the gas turbine engine. A replaceable member removably attached to the first segment and the second segment.

20 Claims, 6 Drawing Sheets

ENGINE SKID ASSEMBLY

TECHNICAL FIELD

The present disclosure relates to a skid assembly to support and transport a gas turbine engine, and more particularly to a modular skid assembly for large gas turbine engines.

BACKGROUND

An engine skid assembly is used for supporting and transporting a gas turbine engine. Engine skid assemblies which are not rated for heavy loads often results in failure of front down bolts due to high loads of the gas turbine engine. U.S. Pat. No. 7,963,542 relates to a modular cart for a gas turbine engine that has a removable first cart and a second cart for supporting and transporting the gas turbine engine sections either separately or in combination. A first connection portion of the first cart may be configured to attach to a second connection portion of the second cart. The modular cart may also have a cart component configured to interchangeably mount to either a first mounting location of the first cart or to a second mounting location of the second cart.

SUMMARY

In one aspect, the present disclosure describes a skid assembly for a gas turbine engine. The skid assembly includes a first segment having a first engine support structure and a second segment having one or more second engine support structures. The first engine support structure configured to support a gas producer group of the gas turbine engine and the one or more second engine support structures configured to support a turbine power group of the gas turbine engine. A replaceable member removably attached to the first segment and the second segment.

In another aspect, the skid assembly further includes tubular members provided on the first segment and the second segment. The tubular members configured to be fixed at different heights with respect to holding brackets provided on the first segment and the second segment.

In another aspect, the skid assembly further may include a plurality of wheel assemblies and structural rings provided on the first segment and the second segment. Furthermore, a hitch assembly may be mounted on the first segment via one or more fasteners. In yet another aspect, the first segment, the second segment, the replaceable member, the first engine support structure, the second engine support structures, the wheel assembly, and the hitch assembly are configured to be disassembled and arranged in an envelope.

Other features and aspects of this disclosure will be apparent from the following description and the accompanying drawings.

DETAILED DESCRIPTION

Figure 1:
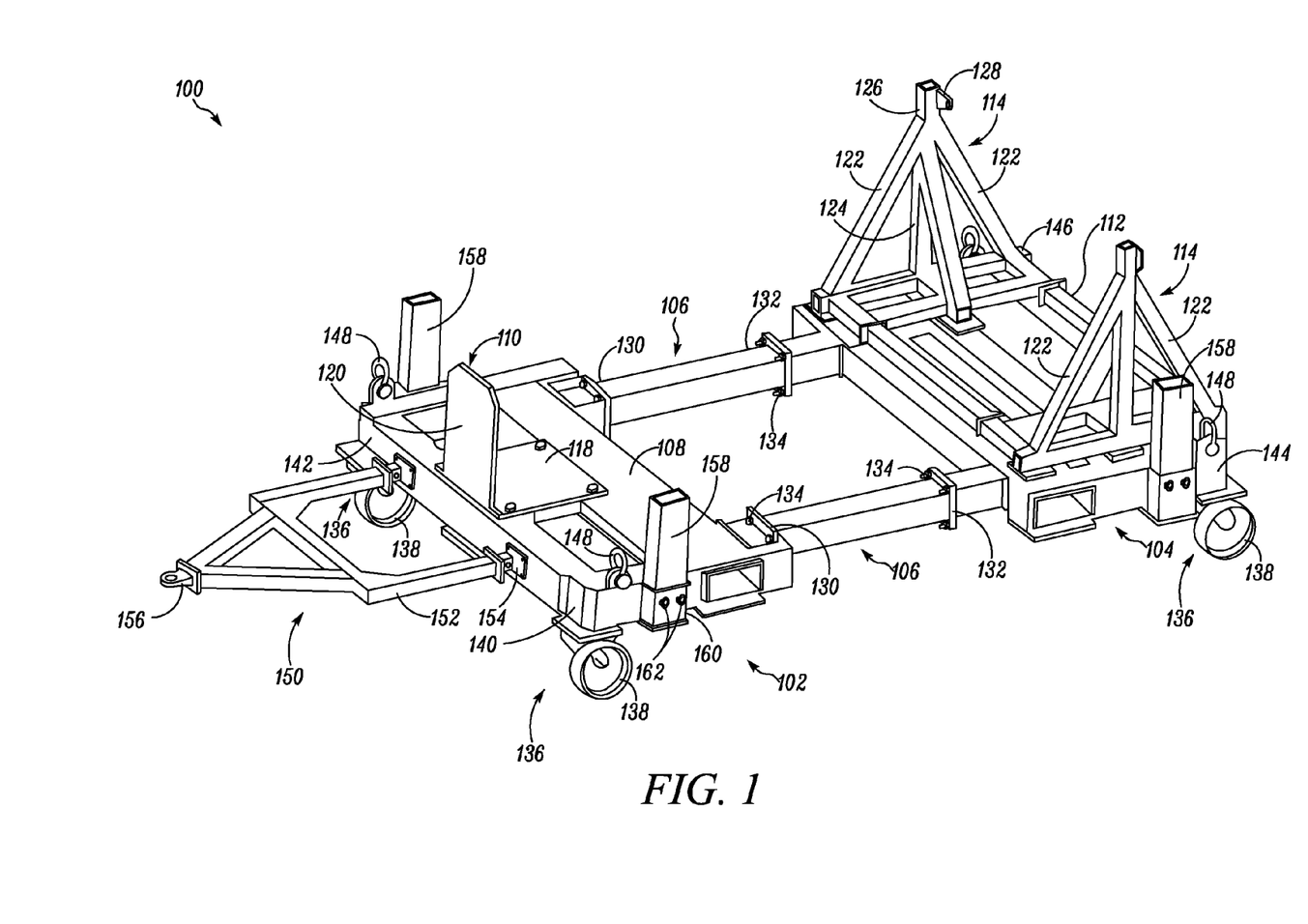
FIG. 1 illustrates a perspective view of a skid assembly, according to an aspect of the present disclosure.

FIG. 1 illustrates a skid assembly 100 configured to support and transport a gas turbine engine 200 (see FIG. 2), in accordance with an embodiment of the present disclosure. The skid assembly 100 may have a modular design and include a first segment 102, a second segment 104 and a replaceable member 106. The first segment 102 includes a first frame 108 and a first engine support structure 110. The second segment 104 includes a second frame 112 and one or more second engine support structures 114. The first segment 102 and the second segment 104 may include either solid or hollow tubular members, for example, transverse and longitudinal tubular members forming the first frame 108 and the second frame 112, respectively.

The one or more second engine support structures 114 may have either similar or different structures from the first engine support structure 110. Alternatively, the first engine support structure 110 and the second engine support structures 114 may be interchangeably configured to be arranged on the first and the second segments 102, 104.

In an embodiment of the present disclosure as illustrated in FIG. 1, the first engine support structure 110 may include a base member 118 and a vertical member 120. The base member 118 is fastened to the first frame 108 and the vertical member 120 is disposed substantially perpendicular to the base member 118. In another embodiment of the present disclosure, the first engine support structure 110 may include one or more support ribs or plates provided between the base member 118 and the vertical member 120. Further, each of the second engine support structures 114 may be fastened to the second frame 112 and include a one or more of angled stanchions 122 and a vertical stanchion 124. Further, the one or more angled stanchions 122 may be joined to a common junction 126 on the vertical stanchions 124. The angled stanchions 122 and the vertical stanchions 124 may be joined to form the common junction 126 by welding or any other similar techniques known in the art. Further, the vertical stanchion 124 may include a cantilever bracket 128 disposed substantially near to the common junction 126.

Further, the replaceable member 106 may include a hollow tubular member for example a spacer, a block, or any other similar structure known in the art. The first segment 102 is removably connected to a first end 130 of the replaceable member 106 and the second segment 104 is removably connected to a second end 132 of the replaceable member 106 to by a plurality of connectors 134. The plurality of connectors 134 may include a fastening unit, such as, but not limited to, a nut and bolt assembly or any similar fastening unit well known in the art. Alternatively, the first segment 102 and the second segment 104 may be connected, for example, in a telescopic relation via the replaceable member 106.

The skid assembly 100 may further include a plurality of wheel assemblies 136 for providing mobility to the skid assembly 100. In an embodiment of the present disclosure, the wheel assemblies 136 may include casters 138 may be mounted on each of the first and the second segments 102, 104. It is contemplated that the skid assembly 100 may include any suitable number of wheel assemblies 136 mounted at any suitable locations to provide mobility. For example, the first segment 102 may include four wheel assemblies 136 with casters 138 to provide mobility, such as two wheel assemblies 136 mounted adjacent a first end 140 of the first segment 102 and two wheel assemblies 136 mounted adjacent a second end 142 of the first segment 202. Further, two wheel assemblies 136 mounted adjacent a first end 144 of the second segment 104 and two wheel assemblies 136 mounted adjacent a second end 146 of the second segment 104. Each of the wheel assemblies 136 may be removably mounted to the skid assembly 100, such that, each wheel assembly 136 may be interchangeably used with the first and the second segments 102, 104 of the skid assembly 100.

Further, the skid assembly 100 may also include one or more structural rings 148. The structure rings 148 may be provided at the first ends 140, 144 and the second ends 142, 146 of the first segment 102 and the second segment 104, respectively. The structural rings 148 may be used by a hoist (not shown) to lift and position the skid assembly 100. Alternatively, each structural ring 148 may be used as a tie-down point, for example, to a transport vehicle (not shown). The skid assembly 100 may also include a hitch assembly 150 mounted on the first segment 102. The hitch assembly 150 may include a hitch frame 152 which further includes, for example, a pair of hitch-mounting flanges 154 configured to mount on the first segment 102 or on the second segment 104, via one or more fasteners. Alternatively, the hitch assembly 150 may be mounted to the skid assembly 100 by any suitable connection type including, for example, telescopically connecting hitch assembly 150 with respect to the first or the second frame structure 108, 112. Further, the hitch assembly 150 may also include a hitching structure 156 opposite to the hitch-mounting flanges 154. It is contemplated that the hitching structure 156 may include, for example, a ring, a hook, a ball, or any other suitable hitching structure 156 to permit hitch assembly 150 to mount on a corresponding hitch receiver of a vehicle.

The skid assembly 100 may further include tubular members 158 provided at the first ends 140, 144 and the second ends 142, 146 of the first segment 102 and the second segment 104, respectively. The tubular members 158 may be configured to be fixed at different heights with respect to a holding bracket 160. Further, the holding bracket 160 includes a pin and slot mechanism 162 for retaining the tubular members 158 at different heights.

Figure 2:
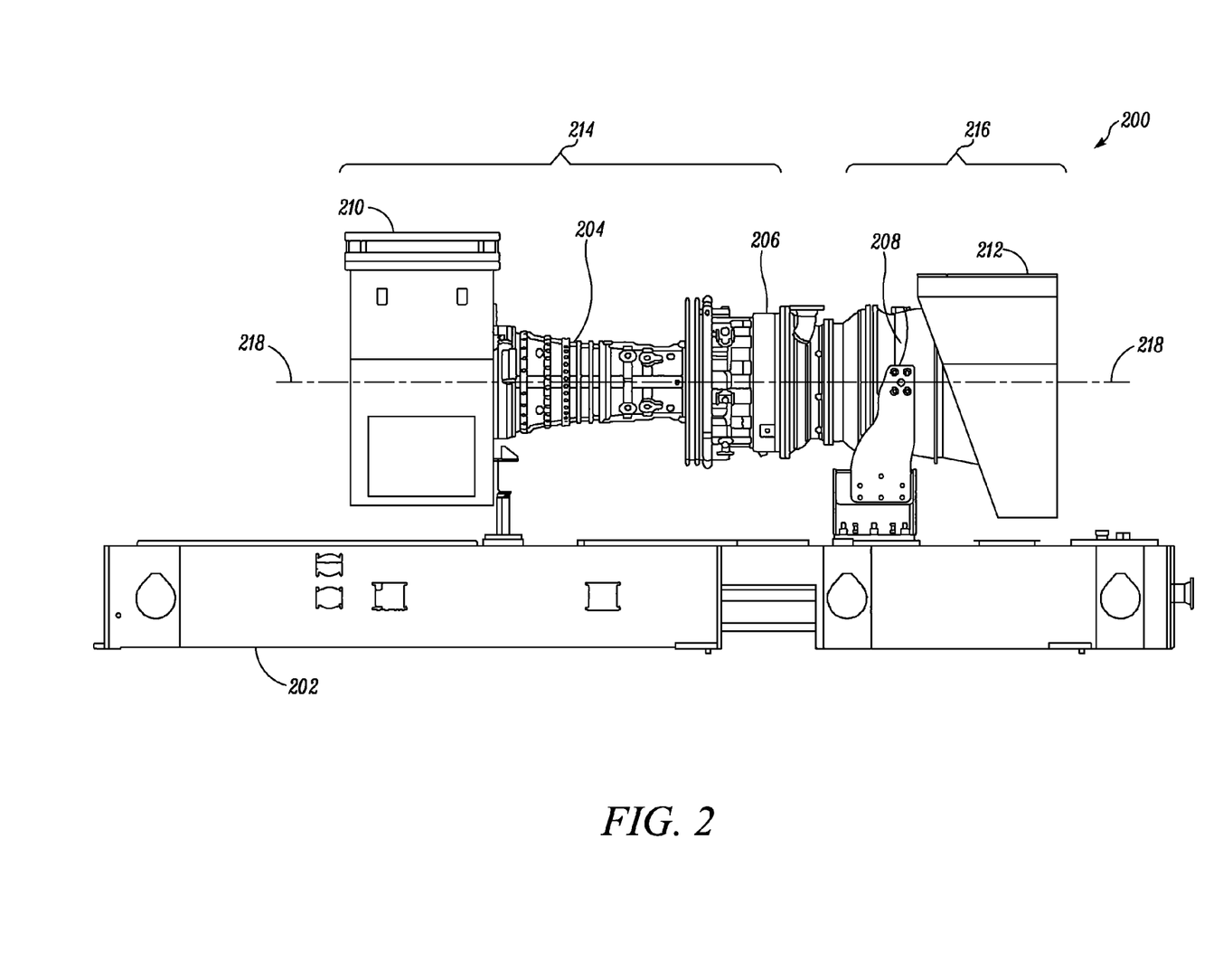
FIG. 2 illustrates a side view of a gas turbine engine mounted on a stationary support structure.

FIG. 2 illustrates the gas turbine engine 200 mounted on a stationary support structure 202. The gas turbine engine 200 may be of any type. In one embodiment, the gas turbine engine 200 may be an industrial turbine engine, for example, but not limited to, an axial flow gas turbine used for power generation or driving mechanical assemblies, or used in jet propulsion systems. As illustrated in FIG. 2, the gas turbine engine 200 may embody an axial flow industrial gas turbine which may be used for power generation or gas compression. The gas turbine engine 200 may have a plurality of sections, including, for example, a compressor section 204, a combustor section 206, and a turbine section 208. The gas turbine engine 200 may further include an air inlet duct 210 and an exhaust collector box 212. The compressor section 204, the combustor section 206, and the air inlet duct 210 may collectively define a gas producer group 214 of the gas turbine engine 200. The turbine section 208 and the exhaust collector box 212 may be alone or collectively define a turbine power group 216 of the gas turbine engine 200.

During operation of the gas turbine engine 200, the compressor section 204 may draw air into the gas turbine engine 200 through the air inlet duct 210 and compress the air before it enters the combustor section 206. The compressed air from the compressor section 204 mixes with fuel to provide an air and fuel mixture to be ignited in the combustor section 206. Subsequently, high pressure and high temperature combustion gases generated in the combustor section 206 may be passed through the turbine section 208 to rotate a plurality of turbine blades (not illustrated). After passing through the turbine section 208, the combustion gases may be directed into the exhaust collector box 212, before expelled to the atmosphere. The air inlet duct 210, the compressor section 204, the combustor section 206, the turbine section 208, and the exhaust collector box 212 may be aligned along a longitudinal axis 218.

Referring back to FIG. 1, it may be apparent to a person having ordinary skill in the art that, the skid assembly 100 may support and facilitate the transport of the gas turbine engine 200 while moving from or placing on a stationary support structure 202. According to an embodiment of the present disclosure, the first and the second engine support structures 110, 114 may be configured to support the gas producer group 214 and a turbine power group 216 of the gas turbine engine 200. In the illustrated embodiment, the vertical member 120 of the first engine support structure 110 may be configured to support the gas producer group 214 and the cantilever bracket 128 provided on the second engine support structures 114 may be configured to support the turbine power group 216. Alternatively, the first engine support 110 and the second engine support 114 may interchangeably support the turbine power group 216 and the gas producer group 214, respectively.

Further, the first and the second engine support structures 110, 114 may be designed to accommodate various sections of the gas turbine engine 200. Alternatively, additional set of engine supporting structures may be used based on the size and shape of the gas turbine engine 200. A person having ordinary skill in the art will understand that the first and the second engine support structures 110, 114 may have different designs or shapes or materials adapted for supporting and transporting the gas turbine engine 200.

Figure 3:
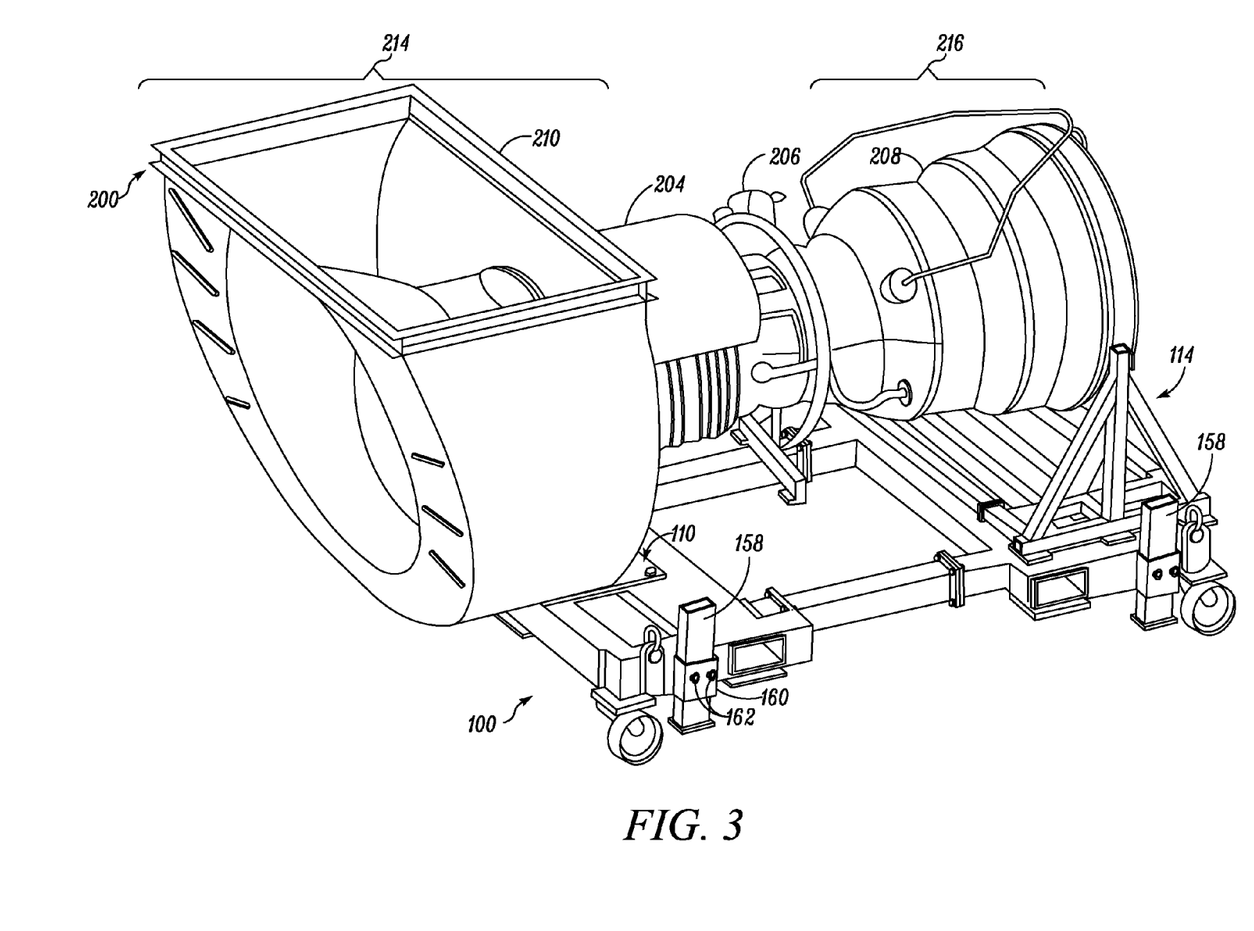
FIG. 3 illustrates a perspective view the gas turbine engine and the skid assembly, according to an aspect of the present disclosure.
Figure 4:
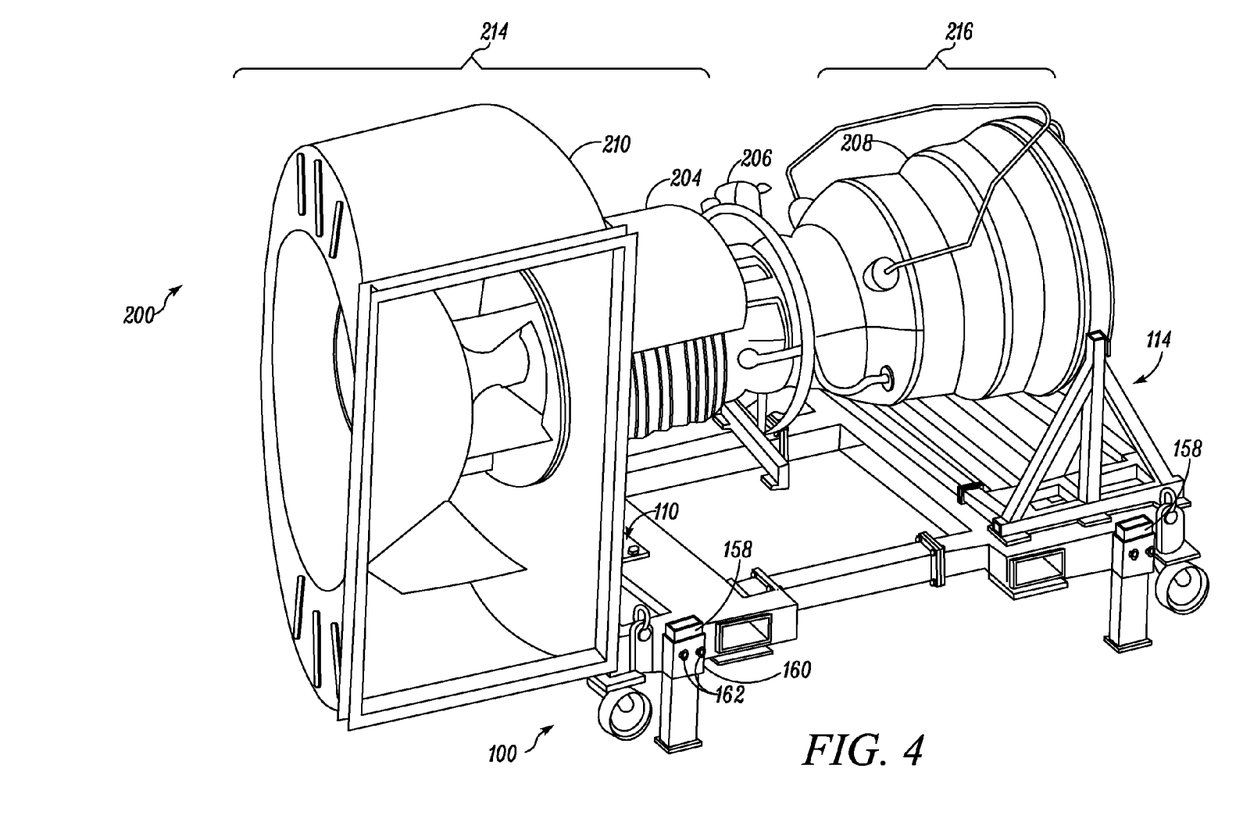
FIG. 4 illustrates a perspective view the gas turbine engine and the skid assembly with an air inlet duct rotated, according to another aspect of the present disclosure.

FIGS. 3 and 4 illustrate perspective views of the gas turbine engine 200 and the skid assembly 100, according to various embodiments of the present disclosure. As illustrated in the FIGS. 3 and 4, the gas producer group 214 of the gas turbine engine 200 is mounted on the first engine support structure 110 of the skid assembly 100. Further, the turbine power group 216 of the gas turbine engine 200 is mounted on the second engine supporting structures 114 of the skid assembly 100. As illustrated in FIG. 3, the air inlet duct 210 of the gas turbine 200 faces upward with the tubular members 158 locked at a first height. Moreover, as described above, the tubular members 158 may be extended through the holding brackets 160 and secured to a suitable height to raise the skid assembly 100 to a second height relative to a ground surface. Thus allow, as illustrated in FIG. 4, the air inlet duct 210 may be rotated and faces laterally, while the telescopic tubular members 158 locked in the second height.

Figure 5:
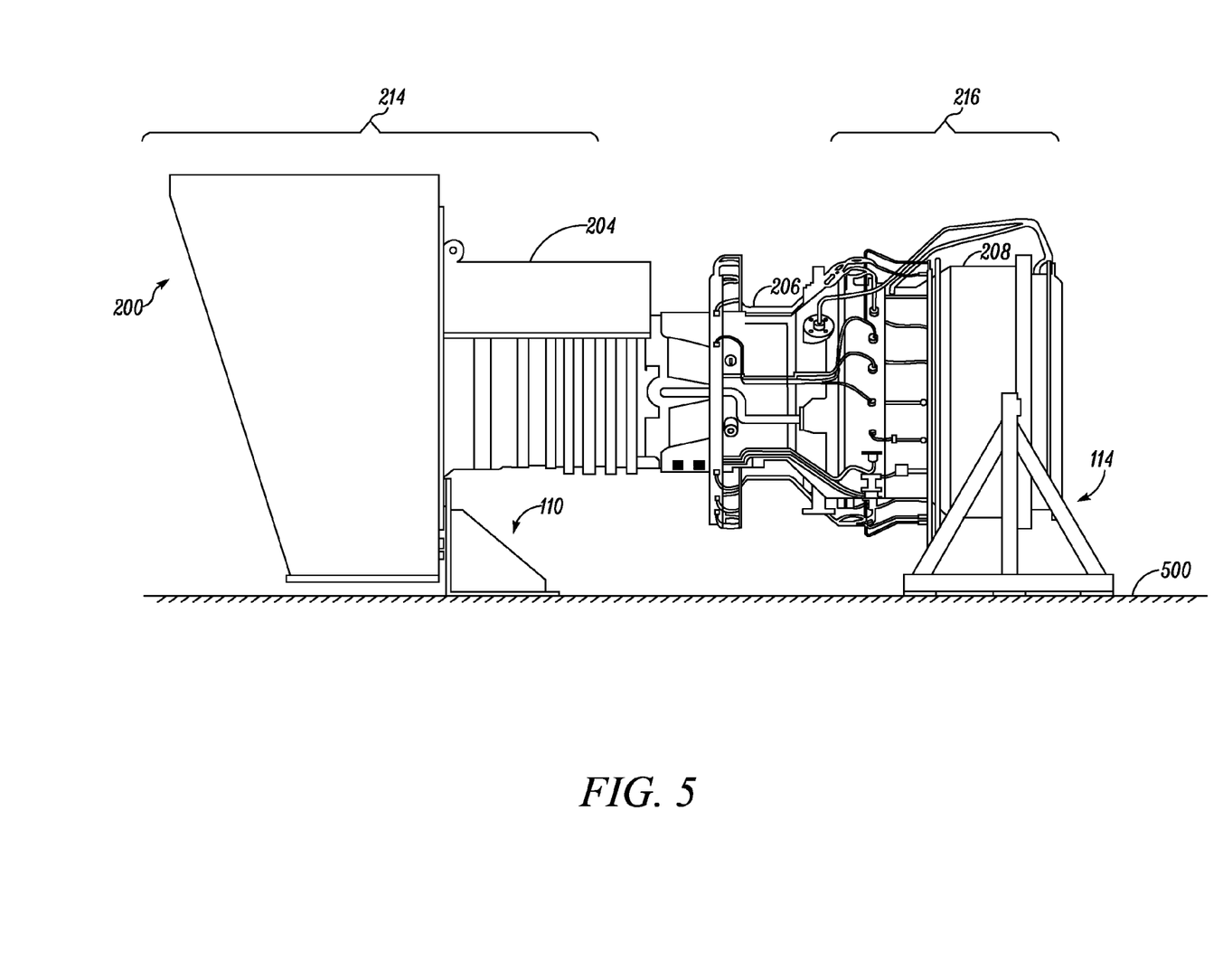
FIG. 5 illustrates a side view of the gas turbine engine and the engine support structures, according to an aspect of the present disclosure.

FIG. 5 illustrates a side view of the gas turbine engine 200 supported on the first engine support structure 110 and the second engine support structures 114, in accordance with another embodiment of the present disclosure. The first and the second engine support structures 110, 114 support the gas producer group 214 and the turbine power group 216 of the gas turbine engine 200 on ground 500. As described above, the first engine support structure 110 and the second engine support structure 114 are easily removable from the skid assembly 100. Moreover, the base member 118 of the first engine support structure 110 and a tubular frame of the second engine support structure 114 provide a substantial flat surface area to support the gas turbine engine 200 on the ground 500.

Figure 6:
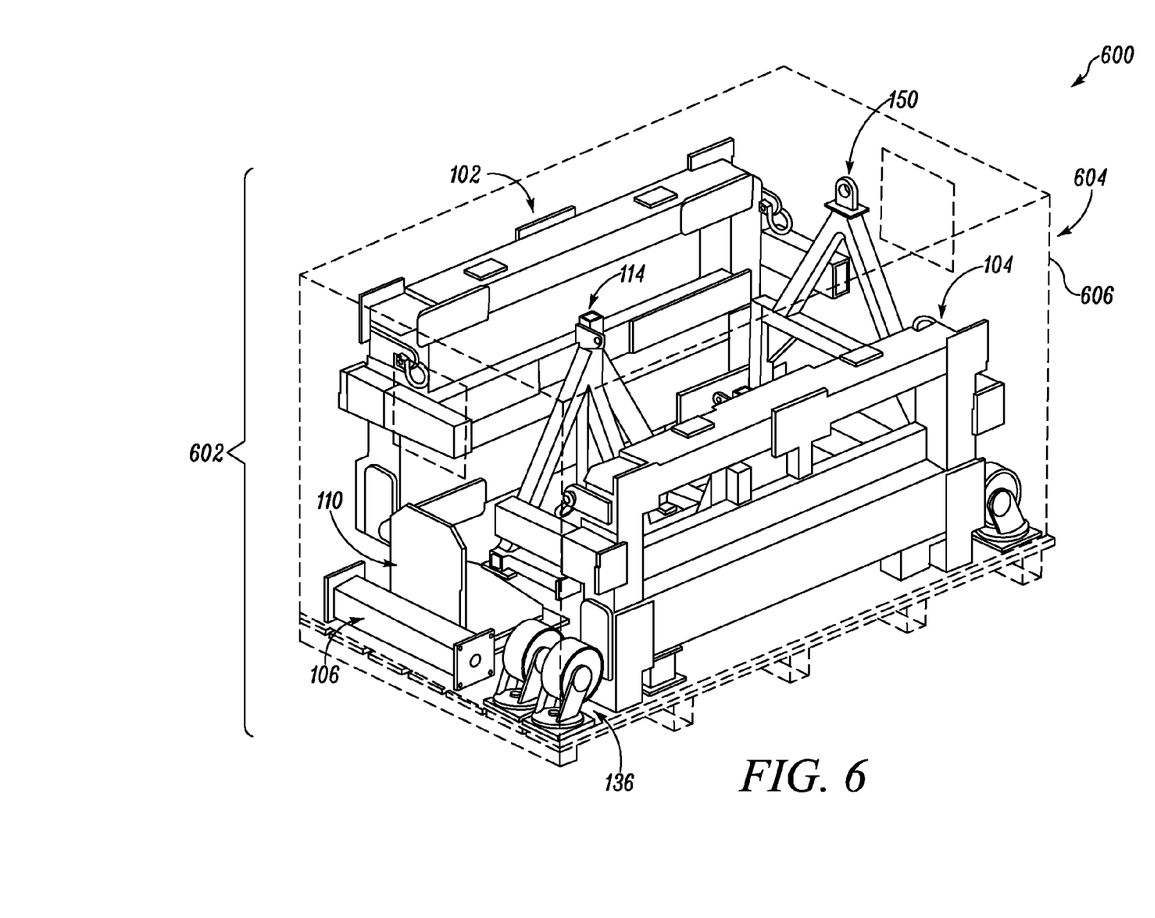
FIG. 6 illustrates a perspective view of a disassembled skid assembly arranged in an envelope, in accordance with an aspect of the present disclosure.

FIG. 6 illustrates a perspective view of a disassembled skid assembly 600, in accordance with an embodiment of the present disclosure. The first segment 102, the second segment 104, the replaceable member 106, the first engine support structure 110, the second engine support structures 114, the wheel assembly 136, and the hitch assembly 150 together herein referenced as skid assembly components 602. The skid assembly components 602 may be configured to be detachably attached to form a skid assembly 100 as illustrated in FIG. 1. Further, the skid assembly components 602 may be configured to disassembled and arranged in an envelope 604 (as illustrated in dashed lines). The envelope 604 may be in the shape of a cuboid, or any similar shape one skilled in the art may adapt, having smaller length as compared to an overall length of the assembled skid assembly 100, and also allow a compact arrangement of the skid assembly components 602. According to an embodiment, the envelope 604 may include a container 606 made of a high strength material well known in the art and having standardized dimensions. The container 606 may be loaded and unloaded, stacked, transported over long distances, and transferred from one mode of transport to another, for example ships, rail and trucks.

INDUSTRIAL APPLICABILITY

The disclosed skid assembly 100 may be configured to support and transport any type of industrial turbine engine, for example, a gas turbine engine 200, but not limited to, an axial flow turbine used for power generation or driving mechanical assemblies, or in jet propulsion systems.

Generally, the one or more sections or groups of the gas turbine engine 200 are needed to be transported from a first location to a second location. Further, the gas turbine engine 200 may be transported as a complete engine (e.g., including the compressor section 204, the combustor section 206, and the turbine section 208), for example, during installation. In order to transport the gas turbine engine 200, the skid assembly 100 may include the first segment 102 which is removably attached with the second segment 104 via the replaceable member 106. Further, the replaceable member 106 may be selected to accommodate different sizes of gas turbine engines 200 between the first segment 102 and the second segment 104. Thus, the skid assembly 100 may be used to transport different sizes of the gas turbine engines 200 based on the requirements. Further, the first and the second engine support structures 110, 114 may be made of a rigid material well known in the art so that heavy gas turbine engines 200 may be effectively supported without failure.

As further illustrated in FIG. 1, the wheel assemblies 136, which further include the casters 138, may assist the skid assembly 100 for easy mobility purposes. The wheel assemblies 136 may assist in moving the skid assembly 100 while the gas turbine engine 200 is placed on it. Further, the wheel assemblies 136 may be locked at a specific position, so that the skid assembly 100 can be moved in a particular desired direction. The structural rings 148 provided on four corners of the skid assembly 100 may facilitate easy handling by a hoist to lift and position the skid assembly 100 while transportation. Alternatively, the structural rings 148 may be used as a tie-down point for securing the skid assembly 100. Further, the hitch assembly 150 may be connected to the vehicle to push or pull the skid assembly 100.

In another embodiment, the skid assembly 100 may be transported in a fixed position for long range transport on a deck of a transport vehicle, for example, on a ship deck or on a train car. In order to move the skid assembly 100 into position on the transport vehicle, the wheel assemblies 136 may be removed from the skid assembly 100, and the structural rings 148 may be used by a hoist mechanism (not shown) to position the skid assembly 100. Once the skid assembly 100 is in place on the transport vehicle, the structural rings 148 may be used as the tie-down points to secure the skid assembly 100 during the transport.

As illustrated in FIGS. 3 and 4, the tubular members 158 are configured to be moved between the first and the second positions to allow the air inlet duct 210 to rotate in different direction. As described above, the tubular members 158 are configured to provide an increased clearance from the ground for rotation of the air inlet duct 210 in a first orientation during shipping and to a second orientation on site to facilitate installation. As illustrated in FIG. 3, of the skid assembly 100 with the gas turbine engine 200 having the air inlet duct 210 facing upward may reduce an overall space requirement during the transport. Moreover, as illustrated in FIG. 4, the tubular members 158 are extended to provide the clearance that allows the air inlet duct 210 to be rotated, facing laterally, to facilitate the installation process on the site.

Moreover, as illustrated in FIG. 5, the first and the second engine support structures 110, 114 may be used to support the gas turbine engine 200 on the ground 500 during an engine exchange process. To begin with, the first and the second engine support structures 110, 114 may be removed from the skid assembly 100 and used to support the gas turbine engine 200 on the ground 500. At once, the skid assembly 100 may be used along with another set of the first and the second engine support structures 110, 114 to support another gas turbine engine during the engine exchange process at the site. Thus, it eliminates the requirement of multiple skid assemblies during the engine exchange process.

As illustrated in FIG. 6, the first segment 102, the second segment 104, the replaceable member 106, the first engine support structure 110, the second engine support structures 114, the wheel assembly 136 and the hitch assembly 150 together herein referenced as skid assembly components 602. The skid assembly components 602 may be disassembled into the envelope 604 for storage or transportation purposes so that the single skidding assembly 600 may be utilized for different gas turbines 100 thus reducing the overall cost. As described above, the envelope 604 may include the container 606 having the standardized size. In an embodiment, the envelope 604 may have standardized size of a shipping container and may be transported in a more efficient and a cost effective way. Further, the envelop 604 may allow different sizes of skid assemblies may be transported using the container 606 with standardized size.

It will be apparent to those skilled in the art that various modifications and variations can be made to the disclosed modular engine cart without departing from the scope of the disclosure. Other embodiments of the modular engine cart will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A skid assembly for a gas turbine engine including a gas producer group and a turbine power group, the skid assembly comprising:

a first segment having a first frame and a first engine support structure including a base member fastened to the first frame, the base member being a plate, and a vertical member extending substantially perpendicular from the base member to support and contact the gas producer group of the gas turbine engine;

a second segment having a second frame and a plurality of second engine support structures fastened to the second frame, the plurality of second engine support structures configured to support the turbine power group of the gas turbine engine, each support structure of the plurality of support structures including a vertical stanchion and a plurality of angled stanchions joined to a common junction provided on the vertical stanchion, the vertical stanchion including a cantilever bracket disposed substantially near the common junction to support and contact the turbine power group of the gas turbine engine; and a replaceable member removably attached to the first segment and the second segment.

2. The skid assembly according to claim 1, wherein the first engine support structure is removable from the skid assembly including the first frame and the plurality of second engine support structures is removable from the skid assembly including the second frame, and the first engine support structure and the plurality of second engine support structures are configured to support the gas turbine engine on the ground.

3. The skid assembly according to claim 1, wherein the first segment is removably connected to a first end of the replaceable member and the second segment is removably connected to a second end of the replaceable member by a plurality of connectors.

4. The skid assembly according to claim 1 further includes a plurality of wheel assemblies mounted on the first segment and the second segment.

5. The skid assembly according to claim 4 further includes a hitch assembly mounted on the first segment via one or more fasteners.

6. The skid assembly according to claim 5, wherein the first segment, the second segment, the replaceable member, the first engine support structure, the plurality of second engine support structures, the wheel assembly, and the hitch assembly are configured to be disassembled and arranged in an envelope.

7. The skid assembly according to claim 1 further includes one or more structural rings provided on the first segment and the second segment.

8. The skid assembly according to claim 1 further includes tubular members provided on the first segment and the second segment, each tubular member extending through a holding bracket and being configured to be locked at a first height or a second height.

9. The skid assembly according to claim 8, wherein the second height is selected to provide an increased clearance from the ground for rotation of an air inlet duct of the gas turbine engine.

10. The skid assembly according to claim 8, wherein each holding bracket includes a pin and slot mechanism for retaining the tubular members at the first height and the second height.

11. The skid assembly according to claim 1, wherein the skid assembly is configured to accommodate different sizes of gas turbine engines based on the selected replaceable member.

12. A skid assembly for a gas turbine engine, the skid assembly comprising:

a first segment having a first end, a second end, and a first engine support structure, the first engine support structure configured to support a gas producer group of the gas turbine engine;

a second segment having a third end, a fourth end, and a plurality of second engine support structures, the plurality of second engine support structures configured to support a turbine power group of the gas turbine engine, each support structure of the plurality of support structures including a vertical stanchion and a plurality of angled stanchions joined to a common junction provided on the vertical stanchion, the vertical stanchion including a cantilever bracket; and tubular members including a first tubular member located at the first end, a second tubular member located at the second end, a third tubular member located at the third end, and a fourth tubular member located at the fourth end, each of the tubular members extending telescopically through a holding bracket and to lock at a first height and at a second height.

13. The skid assembly according to claim 12 further includes an adjustable member removably attached to the first segment and the second segment, wherein the skid assembly accommodates different sizes of gas turbine engines based on the adjustable member.

14. The skid assembly according to claim 13, wherein the first segment is removably connected to a first end of the adjustable member and the second segment is removably connected to a second end of the adjustable member by a plurality of connectors.

15. The skid assembly according to claim 12 further includes a plurality of wheel assemblies mounted on the first segment and the second segment.

16. The skid assembly according to claim 12 further includes a hitch assembly mounted on the first segment via one or more fasteners.

17. The skid assembly according to claim 12 further includes one or more structural rings provided on the first segment and the second segment.

18. The skid assembly according to claim 12, wherein each holding bracket includes a pin and slot mechanism for retaining the tubular members at the first height and the second height.

19. A skid assembly for a gas turbine engine, the skid assembly comprising:

a first segment having a first engine support structure, the first engine support structure configured to support a gas producer group of the gas turbine engine;

a second segment having a plurality of second engine support structures, the plurality of second engine support structures configured to support a turbine power group of the gas turbine engine, each support structure of the plurality of support structures including a vertical stanchion and a plurality of angled stanchions joined to a common junction provided on the vertical stanchion, the vertical stanchion including a cantilever bracket disposed substantially near the common junction to support the turbine power group; and an adjustable member removably attached to the first segment and the second segment, the first segment and the second segment being in a telescopic relation via the adjustable member;

a plurality of wheel assemblies mounted on the first segment and the second segment;

a hitch assembly mounted on the first segment via one or more fasteners, the first segment, the second segment, the replaceable member, the first engine support structure, the plurality of second engine support structures, the wheel assembly, and the hitch assembly are configured to be disassembled and arranged in an envelope;

holding brackets located at each end of the first segment and the second segment;

a tubular member extending through each holding bracket; and a pin and slot mechanism retaining each tubular member within one of the holding brackets.

20. The skid assembly according to claim 19, wherein the pin and slot mechanisms are configured to retain the tubular members at a first height and at a second height.

* * * * *